Patented Sept. 21, 1943

UNITED STATES PATENT OFFICE 2,330,107

1,10 DECANOLAMINE AND METHOD OF PRODUCING IT

William S. Bishop, Cranford, N. J., assignor to Bell Telephone Laboratories, Incorporated, New York, N. Y., a corporation of New York No Drawing. Application November 22, 1940, Serial No. 366,716

8 Claims. (Cl. 260—584)

This invention relates to a new composition of matter, 1,10 decanolamine, $NH_2—(CH_2)_{10}—OH$, and to a novel and advantageous method of producing it and other hydrocarbon alcohol amines.

While the novel substance of the present invention may be employed for various purposes, it may be employed to particular advantage in the manufacture of high molecular weight linear polymers from which fibres, threads, fabrics, sheets, coatings, impregnants and the like may be prepared.

The novel method of the present invention may be employed to produce readily and economically the 1,10 decanolamine of the present invention as well as other hydrocarbon alcohol amines. The method involves simultaneously reducing under suitable conditions the cyano and ester groups of an ester of a cyano hydrocarbon acid. For the purposes of illustration and convenience the method of the present invention will be described in connection with the production of 1,10 decanolamine.

To produce this substance, preferably the cyano and ester groups of 9-cyano-methyl-nonanoate are reduced, although other esters, preferably alkyl esters, may be employed. With the methyl ester, the reaction probably occurs as follows:

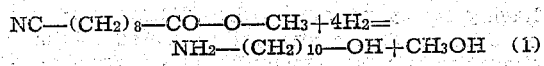

It has been found that the reduction may be very readily accomplished with large yields of 1,10 decanolamine by dissolving the 9-cyano-methyl-nonanoate in a large excess of alcohol and adding metallic sodium to the solution in a quantity larger than that theoretically required to perform the desired reduction of the groups at both ends of the 9-cyano-methyl ester. In such case the metallic sodium reacts with the alcohol to produce a sodium alcoholate and hydrogen, believed to be nascent hydrogen, which performs the reduction of the cyano and ester groups of the 9-cyano-methyl-nonanoate. Usually ethyl alcohol, which is readily available, may be employed, although other alcohols may be used. The reactions which occur involve, first, the formation of hydrogen by reaction of the sodium with the alcohol and, second, the action of the hydrogen thus formed to reduce the end groups of the methyl ester of the cyano acid. The reactants may be considered as participating in a single reaction, which may be written as follows:

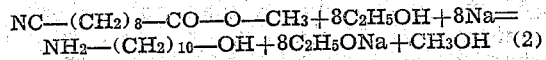

It is preferable to employ one and one-half or two or even more equivalent weights of sodium, based on the weight of the cyano methyl ester to be reduced, to form sufficient hydrogen to replace that which escapes or which does not react with the methyl ester of the cyano acid. Under such circumstances, much larger yields, in general about 30 per cent or more of the calculated yields, are obtainable than when equivalent weights of sodium and the cyano methyl ester are employed. It is also desirable that absolute alcohol be employed, since the presence of water in the alcohol tends to reduce the yields.

The following is an illustrative example of the present invention. In two liters of absolute ethyl alcohol, 102 grams of 9-cyano-methyl-nonanoate are dissolved, after which 150 grams of metallic sodium, or one and one-half equivalents based on the weight of the 9-cyano-methyl-nonanoate employed, are added. After the reduction has occurred, the whole mass is poured into water and the alcohol distilled off. The remaining insoluble layer is then distilled with the recovery of about 29 grams of 1,10 decanolamine or about a 32 per cent yield.

If desired, after the alcohol has been distilled off, the insoluble layer may be extracted with boiling ether to recover the 1,10 decanolamine, which may be refractionated. This method works particularly well when larger amounts of the decanolamine are present in the insoluble layer, as for instance, those due to the employment of two or more equivalents of sodium.

The 9-cyano-methyl-nonanoate which is reduced according to the present invention is a new product developed by the present inventor, although it forms no part of the present invention, being described and claimed in the copending application, Serial No. 366,717 filed November 22, 1940, by the present inventor. It may be produced by various methods, such for example, as those indicated in said copending application.

For example, it may be produced from sebacic acid or sebacic anhydride as a starting material. Either of these substances or a mixture of both is refluxed with commercial methanol for about twenty-four hours, the resulting monomethyl sebacate being recovered by distillation. After purification the monomethyl sebacate is reacted with thionyl chloride in proportions of 324 parts of the monomethyl sebacate to 177 parts of the thionyl chloride. These substances are heated together at a temperature of about 50° C. to 60° C. until the reaction is complete, which requires about an hour. The desired reaction product, the methyl ester of the chloride of sebacic acid, $Cl—OC—(CH_2)_8—CO—O—CH_3$, is not separated from its other reaction products, but the mixture is dropped into concentrated ammonium hydroxide. At room temperature a rapid reaction occurs with the precipitation of the amide of the methyl ester of sebacic acid.

After the amide has been recovered in pure form, as by crystallization, it is mixed with a like amount of phosphorus pentoxide, $P_2O_5$, in a mortar, the mixture is transferred to a large flask, covered with tetrachloroethane and heated for about one-half hour at about 150° C. At the end of this time the solvent containing the reaction product is decanted and collected, the residue in the flask being recovered with fresh solvent and reheated, after which the solvent is again decanted, the procedure being repeated several times. The desired starting material employed in the process of the present invention, 9-cyano-methyl-nonanoate may be recovered from the collected solvent by fractional distillation.

Another method of producing the 9-cyano-methyl-nonanoate involves mixing together sebacic acid and an ammonia-forming substance such as urea, the amount of the ammonia-forming substance employed being only slightly, if any, greater than the amount calculated to form the diamide. The reactants are heated together for several hours at a temperature of from about 180° C. to 200° C., the mixture of reaction products being distilled without isolation of the amide. The amides thus formed are dehydrated as they are formed, the reaction product mixture containing the mononitrile and the dinitrile of sebacic acid as well as the acid itself.

The mononitrile of sebacic acid

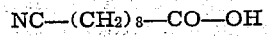

is separated from the other products and then esterified by reacting with the mononitrile an excess of methyl alcohol together with a small amount of paratoluene sulphonic acid as a catalyst, or by the action of dimethyl sulphate on the sodium salt of 9-cyano-nonanoic acid in alcohol. The desired 9-cyano-methyl-nonanoate may be recovered by fractional distillation.

According to another method of producing 9-cyano-methyl-nonanoate, after the sebacic acid and urea have been heated until dehydration of the resulting amide has occurred the mixture of the reaction products, without distillation thereof, is dissolved in methyl alcohol. A small amount of sulphuric acid is added as a catalyst and the whole is refluxed for about 36 hours. The reaction product comprises the dinitrile of sebacic acid, dimethyl sebacate, and the desired 9-cyano-methyl-nonanoate. The latter may be readily recovered by fractional distillation.

According to another method of producing the starting substance of the present invention, one of the nitrile groups of the dinitrile of sebacic acid is hydrolyzed to form the acid, and the resulting carboxyl group is reacted with methyl alcohol to form the methyl ester, both reactions being performed simultaneously, if desired. The dinitrile of sebacic acid may be prepared by heating together with sebacic acid and an ammonia-producing substance such as urea. One mol of the dinitrile may be dissolved in excess methyl alcohol, one mol of $H_2O$ and one mol of $H_2SO_4$ being added. The solution is refluxed for about twenty-four hours and then washed with water and with sodium carbonate solution. Distillation yields a large fraction of practically pure 9-cyano-methyl-nonanoate.

The substance of the present invention, 1,10 decanolamine, is a white solid, insoluble in water, having a melting point in the neighborhood of 72.0° to 72.2° C. and a boiling point of about 154° C. at a pressure of 3 millimeters of mercury. While it is capable of various uses, it may be particularly advantageously employed in the manufacture of high molecular weight linear polymers by reaction with a dibasic acid under polymerizing conditions, according to the method indicated in the application, Serial No. 366,718, filed November 22, 1940, by C. J. Frosch.

While the above-described method for preparing the novel composition of matter of the present invention is preferable, it is apparent that various modifications may be made therein without departing from the spirit of the invention.

It is intended that the patent shall cover in the appended claims whatever features of patentable novelty reside in the invention.

What is claimed is:

1. The process of producing an alcoholamine having its amino and hydroxyl groups separated by an aliphatic chain comprising simultaneously reducing with sodium and an alcohol the cyano and ester groups of an ester of a cyano acid having its cyano and ester groups separated by an aliphatic chain.

2. The process of producing an alcoholamine having its amino and hydroxyl groups separated by an aliphatic chain comprising dissolving in an excess of alcohol an ester of a cyano acid having its cyano and ester groups separated by an aliphatic chain and adding an excess of metallic sodium, whereby the cyano and ester groups of said cyano acid are simultaneously reduced to form the alcoholamine, and thereafter separating said alcoholamine from its associated reaction products.

3. The process of producing an alcoholamine having its amino and hydroxyl groups at the opposite ends of a straight saturated aliphatic chain comprising simultaneously reducing with sodium and alcohol the cyano and ester groups of an ester of a cyano acid having its cyano and ester groups at the opposite ends of a straight saturated aliphatic chain.

4. The process of producing an alcoholamine having its cyano and hydroxyl groups at the opposite ends of a straight saturated aliphatic chain comprising dissolving in an excess of alcohol an ester of a cyano acid having its cyano and ester groups at the opposite ends of a straight saturated aliphatic chain and adding an excess of metallic sodium, whereby the cyano and ester groups of said cyano acid are simultaneously reduced to form the alcoholamine, and thereafter separating acid alcoholamine from its associated reaction products.

5. The process of producing an alcoholamine having its amino and hydroxyl groups separated by an aliphatic chain of ten carbon atoms comprising simultaneously reducing with sodium and an alcohol the cyano and ester groups of an ester of a cyano acid having its cyano and ester groups separated by an aliphatic chain of eight carbon atoms.

6. The process of producing 1,10 decanolamine comprising simultaneously reducing with sodium and an alcohol the cyano and hydroxyl groups of 9-cyano-methyl-nonanoate.

7. The process of producing 1,10 decanolamine comprising dissolving 9-cyano-methyl-nonanoate in an excess of alcohol and adding an excess of metallic sodium, whereby the cyano and ester groups of said 9-cyano-methyl-nonanoate are simultaneously reduced, and thereafter separating the resulting 1,10 decanolamine from its associated reaction products.

8. 1,10-decanolamine.

WILLIAM S. BISHOP.